United States Patent
Kurihara

(10) Patent No.: US 7,023,897 B2
(45) Date of Patent: Apr. 4, 2006

(54) TRANSMISSION CIRCUIT

(75) Inventor: Kazuhiro Kurihara, Tokyo (JP)

(73) Assignee: NEC Corporation, Tokyo (JP)

( * ) Notice: Subject to any disclaimer, the term of this patent is extended or adjusted under 35 U.S.C. 154(b) by 816 days.

(21) Appl. No.: 10/020,186

(22) Filed: Dec. 18, 2001

(65) Prior Publication Data
US 2002/0075943 A1 Jun. 20, 2002

(30) Foreign Application Priority Data
Dec. 20, 2000 (JP) .............................. 2000-387598

(51) Int. Cl.
H04B 1/69 (2006.01)
H04B 1/707 (2006.01)
H04B 1/713 (2006.01)

(52) U.S. Cl. ...................... 375/130; 375/260; 375/285; 375/343; 375/367; 327/164; 370/203; 455/42; 455/43; 455/44; 455/45

(58) Field of Classification Search ................ 375/130, 375/146, 260, 285, 343, 367; 455/112, 42–45; 327/164; 370/203
See application file for complete search history.

(56) References Cited

U.S. PATENT DOCUMENTS

2002/0006776 A1* 1/2002 Hasegawa .................... 455/69
2002/0021744 A1* 2/2002 Iida .............................. 375/130
2004/0014436 A1* 1/2004 Lipka et al. ................. 455/112

FOREIGN PATENT DOCUMENTS

| EP | 1 089 458 A2 | 4/2001 |
|---|---|---|
| JP | 11-266168 | 9/1999 |
| JP | 2000-138655 | 5/2000 |
| WO | WO 01/24402 A1 | 4/2001 |

OTHER PUBLICATIONS

European Search Report dated Feb. 24, 2004.
"Amplitude differences between uplink and DPCCH and DPCCHs", XP-002167844, URL: http://www.3gpp.org/ftp/tsg_ran/WGI_RL1/TSGR1_04/Docs/Pdfs/R1-99347.PDF, May 18, 2001.

* cited by examiner

Primary Examiner—Stephen Chin
Assistant Examiner—Erin M. File
(74) Attorney, Agent, or Firm—McGinn IP Law Group, PLLC

(57) ABSTRACT

A transmission circuit includes a baseband circuit, spreading section, multiplier, digital modulator, quadrature modulator, and antenna. The baseband circuit generates and outputs at least one transmission data constituted by first and second channel data. The spreading section spreads the transmission data with a spreading code that differs for each transmission channel. The multiplier respectively weights the amplitudes of the first and second channel data by using a combination of two gain factors determined by a transmission data rate. The digital modulator digitally modulates the first and second channel data whose amplitudes are weighted by the multiplier. The quadrature modulator quadrature-modulates the digitally modulated first and second channel data and outputs the data as a transmission signal. The antenna emits the transmission signal output from the quadrature modulator as a radio wave. The multiplier weights the amplitudes of the first and second channel data by using gain factors that keep power of the transmission signal output from the quadrature modulator constant regardless of the transmission data rate without changing the ratio of a combination of gain factors determined by the transmission data rate.

24 Claims, 6 Drawing Sheets

| LOGIC VALUE | | SET VALUE | |
|---|---|---|---|
| $\beta c$ | $\beta d$ | $\beta sc$ | $\beta sd$ |
| 15 | 15 | 15 | 15 |
| 15 | 14 | 15.5 | 14.6 |
| 15 | 13 | 16.0 | 13.9 |
| 15 | 12 | 16.6 | 13.3 |
| 15 | 11 | 17.1 | 12.5 |
| 15 | 10 | 17.7 | 11.8 |
| 15 | 9 | 18.2 | 10.9 |
| 15 | 8 | 18.7 | 10.0 |
| 15 | 7 | 19.2 | 9.0 |
| 15 | 6 | 19.7 | 7.9 |
| 15 | 5 | 20.1 | 6.7 |
| 15 | 4 | 20.5 | 5.5 |
| 15 | 3 | 20.8 | 4.2 |
| 15 | 2 | 21.0 | 2.8 |
| 15 | 1 | 21.2 | 1.4 |

FIG.5

| LOGIC VALUE | | SET VALUE | | SET VALUE (4-BIT EXPRESSION) | | $\beta sc4^2 + \beta sd4^2$ | DIFFERENCE [dB] |
|---|---|---|---|---|---|---|---|
| $\beta c$ | $\beta d$ | $\beta sc$ | $\beta sd$ | $\beta sc4$ | $\beta sd4$ | | |
| 15 | 15 | 15 | 15 | 11 | 11 | 242 | 0 |
| 15 | 14 | 15.5 | 14.6 | 11 | 10 | 221 | -0.39423 |
| 15 | 13 | 16.0 | 13.9 | 11 | 10 | 221 | -0.39423 |
| 15 | 12 | 16.6 | 13.3 | 12 | 10 | 244 | -0.035745 |
| 15 | 11 | 17.1 | 12.5 | 12 | 9 | 225 | -0.31633 |
| 15 | 10 | 17.7 | 11.8 | 13 | 8 | 233 | -0.16459 |
| 15 | 9 | 18.2 | 10.9 | 13 | 8 | 233 | -0.16459 |
| 15 | 8 | 18.7 | 10.0 | 13 | 7 | 218 | -0.45359 |
| 15 | 7 | 19.2 | 9.0 | 14 | 6 | 232 | -0.18327 |
| 15 | 6 | 19.7 | 7.9 | 14 | 6 | 232 | -0.18327 |
| 15 | 5 | 20.1 | 6.7 | 14 | 5 | 221 | -0.39423 |
| 15 | 4 | 20.5 | 5.5 | 15 | 4 | 241 | -0.01798 |
| 15 | 3 | 20.8 | 4.2 | 15 | 3 | 234 | -0.146 |
| 15 | 2 | 21.0 | 2.8 | 15 | 2 | 229 | -0.2398 |
| 15 | 1 | 21.2 | 1.4 | 15 | 1 | 226 | -0.29701 |

AGC AMP CONTROL CODE

TRANSMISSION CIRCUIT

BACKGROUND OF THE INVENTION

1. Field of the Invention

The present invention relates to a transmission circuit provided in a communication terminal and, more particularly, to a transmission circuit using the HPSK (Hybrid Phase Shift Keying) modulation scheme.

2. Description of the Prior Art

In the HPSK modulation scheme described in 3G TS 25.213 of 3GPP (3rd Generation Partnership Project) which is a standardization project for W-CDMA (Wide band Code Division Multiple Access) specifications, transmission data is spread by a spreading code first, and then the spread transmission data is multiplied by a gain factor to perform amplitude weighting in HPSK modulation so as to obtain amplitude data. Thereafter, this amplitude data is HPSK-modulated.

FIG. 1 is a block diagram showing an example of the arrangement of a conventional transmission circuit using the HPSK modulation scheme.

As shown in FIG. 1, this conventional circuit is comprised of a baseband circuit 110 for generating and outputting two types of transmission data, namely data channel data DPDCH (Dedicated Physical Data Channel) and control channel data DPCCH (Dedicated Physical Control Channel), a multiplier 120 for spreading the data channel data DPDCH output from the baseband circuit 110 by multiplying the data channel data DPDCH by a spreading code SCd, and outputting the resultant data as spread data d, a multiplier 122 for spreading the control channel data DPCCH output from the baseband circuit 110 by multiplying the control channel data DPCCH by a spreading code SCc, and outputting the resultant data as spread data c, a multiplier 121 for outputting amplitude data Iin by multiplying the spread data d output from the multiplier 120 by a gain factor βd, a multiplier 123 for outputting amplitude data Qin by multiplying the spread data c output from the multiplier 122 by a gain factor βc, an HPSK modulation circuit 130 for receiving the amplitude data Iin and Qin respectively output from the multipliers 121 and 123 and outputting HPSK-modulated data Iout and Qout by mapping the input amplitude data Iin and Qin on the complex I-Q plane in accordance with a scrambling code which is one of the frequency spreading codes in the CDMA scheme and output from the baseband circuit 110, a digital filter 140 for removing high-frequency components from the HPSK-modulated data Iout output from the HPSK modulation circuit 130 and outputting the resultant data as a digital signal Id, a digital filter 142 for removing high-frequency components from the HPSK-modulated data Qout output from the HPSK modulation circuit 130 and outputting the resultant data as a digital signal Qd, a digital/analog converter 141 for converting the digital signal Id output from the digital filter 140 into an analog signal Ia and outputting it, a digital/analog converter 143 for converting the digital signal Qd output from the digital filter 142 into an analog signal Qa and outputting it, and a quadrature modulator 150 for outputting an HPSK signal having a desired frequency by quadrature-modulating the analog signals Ia and Qa respectively output from the digital/analog converters 141 and 143.

Note that each of the spreading code SCd by which the data channel data DPDCH is multiplied by the multiplier 120 and the spreading code SCc by which the control channel data DPCCH is multiplied by the multiplier 122 is one of the frequency spreading codes in the CDMA scheme and has a rate equal to the chip rate. These codes differ for the respective transmission channels to maintain orthogonality between the channels and are output from the baseband circuit 110.

The gain factor βd by which the spread data d is multiplied by the multiplier 121 and the gain factor βc by which the spread data c is multiplied by the multiplier 123 are unique to HPSK modulation. These gain factors are values for respectively weighting an I (Inphase) amplitude and Q (Quadrature) amplitude and output from the baseband circuit 110. Each of the gain factors βd and βc takes a value from 0 to 15 depending on the transmission data rate. One of the gain factors βd and βc is always "15". In addition, since the control channel data DPCCH is always required, the gain factor βc will never be "0".

The amplitude data Iin and Qin respectively output from the multipliers 121 and 123 are obtained by converting the values of "0"/"1" of spread data d and c respectively output from the multipliers 120 and 122 into amplitude values with positive and negative signs and expressed by binary codes in two's complement form.

In the transmission circuit having the above arrangement, the data channel data DPDCH and control channel data DPCCH output from the baseband circuit 110 are respectively multiplied by the spreading codes SCd and SCc to obtain the spread data d and c, and the amplitudes of the spread data d and c are respectively weighted by the gain factors βd and βc, thereby performing HPSK modulation.

High-frequency components are removed from the HPSK-modulated data Iout and Qout, and the resultant data are converted into analog signals. Thereafter, the signals are quadrature-modulated, and the resultant data is output as an HPSK signal having a desired frequency.

In the above transmission circuit, however, since the values of gain factors by which spread data are multiplied are directly reflected in the amplitudes of the HPSK-modulated signals on the complex I-Q plane, the output power of the quadrature modulator changes as the combination of gain factor changes. If the output power of the quadrature modulator changes, the S/N ratio varies. As the output power decreases, the S/N ratio decreases, resulting in a deterioration in adjacent channel leakage power characteristic.

In a system using the CDMA scheme, it is required to always keep the power of the control channel data DPCCH at the antenna end constant even with a change in data rate if the communication condition at the terminal, e.g., the distance between the terminal and the base station, remains the same. In the conventional transmission circuit described above, however, the power of the control channel data DPCCH at the antenna end cannot be kept constant depending on a change in the combination of gain factors or the output power of the quadrature modulator.

SUMMARY OF THE INVENTION

The present invention has been made in consideration of the above problems in the prior art, and has as its object to provide a transmission circuit which can keep the power of a control channel data component at an antenna end constant.

According to the first aspect of the present invention, there is provided a transmission circuit comprising at least a baseband circuit for generating and outputting transmission data constituted by at least one first channel data and one second channel data, spreading means for spreading the transmission data with a spreading code that differs for each transmission channel, multiplication means for respectively weighting amplitudes of the first and second channel data by using a combination of two gain factors determined by a transmission data rate, digital modulation means for digitally modulating the first and second channel data whose amplitudes are weighted by the multiplication means, a quadrature modulator for quadrature-modulating the first and second channel data digitally modulated by the digital modulation means and outputting the data as a transmission signal, and an antenna for emitting the transmission signal output from the quadrature modulator as a radio wave, wherein the multiplication means weights the amplitudes of the first and second channel data by using gain factors that keep power of the transmission signal output from the quadrature modulator constant regardless of the transmission data rate without changing a ratio of a combination of gain factors determined by the transmission data rate.

According to the second aspect of the present invention, the multiplication means in the first aspect can weight the amplitudes of the first and second channel data by using gain factors determined on the basis of power of the transmission signal output from the quadrature modulator without changing a ratio of a combination of gain factors determined by the transmission data rate.

According to the third embodiment, the multiplication means in the first aspect can weight the amplitudes of the first and second channel data by using gain factors that make a sum of a square of a gain factor for weighting the amplitude of the first channel data and a square of a gain factor for weighting the amplitude of the second channel data constant regardless of the transmission data rate without changing a ratio of a combination of gain factors determined by the transmission data rate.

According to the fourth embodiment, the baseband circuit in any one of the first to third aspects comprises a table storing a gain factor determined by the transmission data rate and a gain factor used by the multiplication means to weight the transmission data, and serves to output a gain factor corresponding to the transmission data rate from the table to the multiplication means on the basis of the transmission data rate.

According to the fifth aspect of the present invention, there is provided a transmission circuit comprising at least a baseband circuit for generating and outputting transmission data constituted by at least one first channel data and one second channel data, spreading means for spreading the transmission data with a spreading code that differs for each transmission channel, multiplication means for respectively weighting amplitudes of the first and second channel data by using a combination of two gain factors determined by a transmission data rate, digital modulation means for digitally modulating the first and second channel data whose amplitudes are weighted by the multiplication means, a quadrature modulator for quadrature-modulating the first and second channel data digitally modulated by the digital modulation means and outputting the data as a transmission signal, and an antenna for emitting the transmission signal output from the quadrature modulator as a radio wave, wherein the transmission circuit further comprises amplification means for amplifying the transmission signal output from the quadrature modulator with a gain based on a control voltage, a transmission level circuit for determining a transmission power value of the second channel data component, a first gain offset circuit for adding, to a transmission power value determined by the transmission level circuit, a first gain correction amount for controlling a gain of the amplification means to keep transmission power of the second channel data component at the antenna end constant regardless of the transmission data rate by using a combination of two gain factors determined by the transmission data rate, and outputting the transmission power value, and a voltage generating circuit for generating a voltage for controlling the gain of the amplification means, on the basis of the transmission power value output from the first gain offset circuit, and wherein the antenna emits the transmission signal output from the quadrature modulator and amplified by the amplification means as a transmission signal.

According to the sixth aspect of the present invention, the transmission circuit in the fourth to sixth aspects further comprises amplification means for amplifying the transmission signal output from the quadrature modulator with a gain based on a control voltage, a transmission level circuit for determining a transmission power value of the second channel data component, a first gain offset circuit for adding, to a transmission power value determined by the transmission level circuit, a first gain correction amount for controlling a gain of the amplification means to keep transmission power of the second channel data component at the antenna end constant regardless of the transmission data rate by using a combination of two gain factors determined by the transmission data rate, and outputting the transmission power value, and a voltage generating circuit for generating a voltage for controlling the gain of the amplification means, on the basis of the transmission power value output from the first gain offset circuit, wherein the antenna emits the transmission signal output from the quadrature modulator and amplified by the amplification means as a transmission signal.

According to the seventh aspect of the present invention, the first gain offset circuit in the fifth or sixth aspect calculates transmission power of the first channel data component by using a combination of two gain factors determined by the transmission data rate, adding the transmission power as the first gain correction amount to the transmission power value determined by the transmission level circuit, and outputting the transmission power value.

According to the eighth aspect, the transmission circuit in any one of the fifth to seventh aspects further comprises second gain offset circuit for adding, to the transmission power value output from the first gain offset circuit, a second gain correction amount which is used to correct an output power error caused in the quadrature modulator when the multiplication means weights the amplitudes of the first and second channel data by using gain factors for weighting the amplitudes, wherein the voltage generating circuit generates a voltage for controlling the gain of the amplification means, on the basis of the transmission power value output from the second gain offset circuit.

According to the ninth aspect of the present invention, the second gain offset circuit in the eighth aspect calculates a ratio between output power of the quadrature modulator set when one combination of gain factors of gain factors used to weight the amplitudes of the first and second channel data by the multiplication means is set as a reference combination, and the reference combination of gain factors are used, and output power of the quadrature modulator set when gain factors used to weight the amplitudes of the first and second channel data by the multiplication means are used, adds the ratio as the second gain correction amount to the transmission power output from the first gain offset circuit, and outputs the transmission power.

According to the 10th aspect of the present invention, the second gain offset circuit in the eighth or ninth aspect includes a table storing a gain factor determined by the transmission data rate and a gain factor used by the multiplication means to weight the transmission data.

According to the 11th aspect of the present invention, in the transmission circuit in any one of the above aspects, the first channel data is data channel data of the transmission data, and the second channel data is control channel data of the transmission data.

According to the 12th aspect of the present invention, in the transmission circuit in any one of the above aspects, the digital modulation means is phase modulation means for phase shifting modulating amplitude data of the first and second channel data whose amplitudes are weighted by the multiplication means.

In the present invention having the above arrangement, by using a spreading code that differs for each transmission channel, the spreading means spreads the transmission data constituted by the first and second channel data and generated by the baseband circuit, and the multiplication means weights the amplitudes of the first and first and second channel data by using gain factors that make the power of the transmission signal output from the quadrature modulator constant regardless of the transmission data rate without changing the ratio of the combination of two gain factors determined by the transmission data rate. The digital modulation means digitally modulates the first and second channel data whose amplitudes are weighted by the multiplication means. The resultant signal is then quadrature-modulated by the quadrature modulator and transmitted as a transmission signal through the antenna.

As described above, the multiplication means weights the amplitudes of the first and second channel data by using gain factors determined on the basis of power of the transmission signal output from the quadrature modulator without changing the ratio of the combination of gain factors determined by the transmission data rate. Even if, therefore, the transmission data rate changes and the combination of the gain factors for weighting the first and second channel data changes, the output power of the quadrature modulator is kept constant.

Assume that the transmission power of the first channel data component is calculated by the first gain offset circuit using the combination of two gain factors determined, the transmission power as the first gain correction amount is added to the transmission power value of the second channel data, the transmission signal output from the quadrature modulator is amplified with a gain based on this addition result, and the amplified signal is transmitted through the antenna. In this case, the transmission power of the second channel data component at the antenna end is kept constant regardless of the transmission data rate. In the system using the CDMA scheme, it is required to always keep the power of the control channel data component at the antenna end constant even with a change in data rate if the communication condition at the terminal, e.g., the distance between the terminal and the base station, remains the same. If the first channel data is used as data channel data for transmission data, and the second channel data is used as control channel data for the transmission data, the transmission power of the control channel data component at the antenna end is kept constant regardless of the transmission data rate.

Assume that the second gain offset circuit calculates a ratio between output power of the quadrature modulator set when one combination of gain factors of gain factors used to weight the amplitudes of the first and second channel data by the multiplication means is set as a reference combination, and the reference combination of gain factors are used, and output power of the quadrature modulator set when gain factors used to weight the amplitudes of the first and second channel data by the multiplication means are used, adds the ratio as the second gain correction amount to the transmission power output from the first gain offset circuit, and the transmission signal output from the quadrature modulator is amplified with a gain based on this addition result and transmitted through the antenna. In this case, as is obvious from the respective aspects of the present invention, since the amplitudes of the first and second channel data are weighted by the multiplication means, the following effects can be obtained.

In the transmission circuit according to the first aspect, the multiplication means weights the amplitudes of the first and second channel data by using gain factors that keep power of the transmission signal output from the quadrature modulator constant regardless of the transmission data rate without changing the ratio of the combination of gain factors determined by the transmission data rate. Even if, therefore, the transmission data rate changes and the combination of the gain factors for weighting the first and second channel data changes, the output power of the quadrature modulator is kept constant. This makes it possible to keep the S/N (Signal to Noise) ratio constant in the quadrature modulator and prevent a deterioration in adjacent channel leakage power characteristics.

In the transmission circuit according to the second aspect, the multiplication means weights the amplitudes of the first and second channel data by using gain factors determined on the basis of power of the transmission signal output from the quadrature modulator without changing the ratio of the combination of gain factors determined by the transmission data rate. With this arrangement, the same effects as those in the circuit according to the first aspect can be obtained.

In the transmission circuit according to the third aspect, the multiplication means weights the amplitudes of the first and second channel data by using gain factors that make the sum of the square of a gain factor for weighting the amplitude of the first channel data and the square of a gain factor for weighting the amplitude of the second channel data constant regardless of the transmission data rate without changing the ratio of the combination of gain factors determined by the transmission data rate. With this arrangement, the same effects as those in the circuit according to the first or second aspect can be obtained.

In the transmission circuit according to the fourth aspect, the baseband circuit comprises the table storing a gain factor determined by the transmission data rate and a gain factor used by the multiplication means to weight the transmission data, and outputs a gain factor corresponding to the transmission data rate from the table to the multiplication means on the basis of the transmission data rate. With this arrangement, the same effects as those in the circuit according to each of the first to third aspects can be obtained. In addition, there is no need to calculate a gain factor for each transmitting operation.

The transmission circuit according to the fifth aspect includes the amplification means for amplifying the transmission signal output from the quadrature modulator with a gain based on a control voltage, the transmission level circuit for determining the transmission power value of the second channel data component, the first gain offset circuit for adding, to a transmission power value determined by the transmission level circuit, the first gain correction amount for controlling the gain of the amplification means to keep transmission power of the second channel data component at the amplitude end constant regardless of the transmission data rate by using the combination of two gain factors determined by the transmission data rate, and outputting the transmission power value, and the voltage generating circuit for generating a voltage for controlling the gain of the amplification means on the basis of the transmission power value output from the first gain offset circuit, and the antenna emits the transmission signal output from the quadrature modulator and amplified by the amplification means as a transmission signal. With this arrangement, the transmission power of the second channel data component at the antenna end can be kept constant regardless of the transmission data rate.

In the transmission circuit according to the sixth aspect, the S/N (Signal to Noise) ratio in the quadrature modulator can be made constant, and a deterioration in adjacent channel leakage power can be prevented. In addition, the transmission power of the second channel data component at the antenna end can be made constant regardless of the transmission data rate.

In the transmission circuit according to the seventh aspect, the first gain offset circuit calculates the transmission power of the first channel data component by using the combination of two gain factors determined by the transmission data rate, and adds the transmission power as the first gain correction amount to the transmission power value of the second channel data component, and the transmission signal output from the quadrature modulator is amplified with the gain based on this addition result and transmitted through the antenna. With this arrangement, the same effects as those in the circuit according to the fifth or sixth aspect can be obtained.

The transmission circuit according to the eighth aspect includes the second gain offset circuit for adding, to the transmission power value output from the first gain offset circuit, the second gain correction amount which is used to correct the output power error caused in the quadrature modulator when the multiplication means weights the amplitudes of the first and second channel data by using gain factors for weighting the amplitudes, wherein the voltage generating circuit generates the voltage for controlling the gain of the amplification means, on the basis of the transmission power value output from the second gain offset circuit. With this arrangement, even if an output power error is caused in the quadrature modulator due to an insufficient number of bits expressing gain factors used for weighting in the multiplication means, the error is corrected by the second gain correction amount when the transmission data is amplified, and the power at the antenna end can be corrected.

In the transmission circuit according to the ninth aspect, the second gain offset circuit calculates the ratio between the output power of the quadrature modulator set when one combination of gain factors of the gain factors used to weight the amplitudes of the first and second channel data by the multiplication means is set as a reference combination, and the reference combination of gain factors are used, and the output power of the quadrature modulator set when the gain factors used to weight the amplitudes of the first and second channel data by the multiplication means are used, and adds the ratio as the second gain correction amount to the transmission power output from the first gain offset circuit, and the transmission signal output from the amplitude modulator is amplified with the gain based on the addition result and transmitted through the antenna. With this arrangement, the same effects as those in the circuit according to the eighth aspect can be obtained.

In the transmission circuit according to the 10th aspect, the second gain offset circuit includes a table storing the gain factor determined by the transmission data rate and the gain factor used by the multiplication means to weight the transmission data. With this arrangement, in addition to the same effects as those in the circuit according to the eighth or ninth aspect, there is no need to calculate a gain factor for each transmitting operation.

As in the transmission circuit according to the 11th aspect, when the first channel data is the data channel data of the transmission data, and the second channel data is the control channel data of the transmission data, the transmission power of the control channel data component at the antenna end can be made constant regardless of the transmission data rate.

In the transmission circuit according to the 12th aspect, the above effects can be obtained in the phase modulation scheme of phase-shift modulating the amplitude data of the first and second channel data whose amplitudes are weighted by the multiplication means.

The above and many other objects, feature and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 5 is a table for explaining the gain factors used in the transmission circuit shown in FIG. 2;

FIGS. 6A and 6B are graphs for explaining the operation of the voltage generating circuit shown in FIG. 2, in which FIG. 6A shows the characteristics of the AGC amplifier shown in FIG. 2, and FIG. 6B shows the relationship between the input and output of the voltage generating circuit.

DETAILED DESCRIPTION OF THE PREFERRED EMBODIMENTS

A few preferred embodiments of the present invention will be described in detail below with reference to the accompanying drawings.

Figure 2:
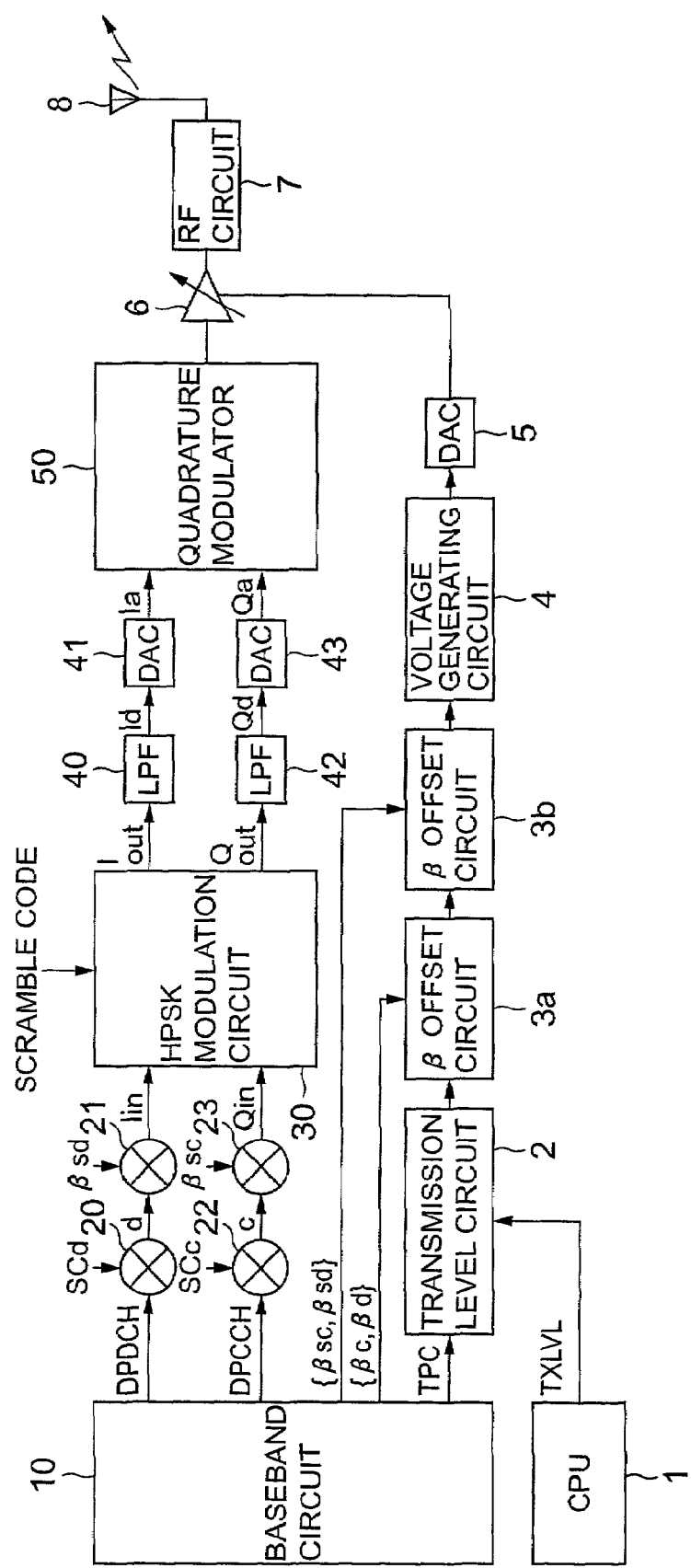
FIG. 2 is a block diagram showing the arrangement of the transmission circuit according to the first embodiment of the present invention.

FIG. 2 is a block diagram showing a transmission circuit according to the first embodiment of the present invention.

Figure 1:
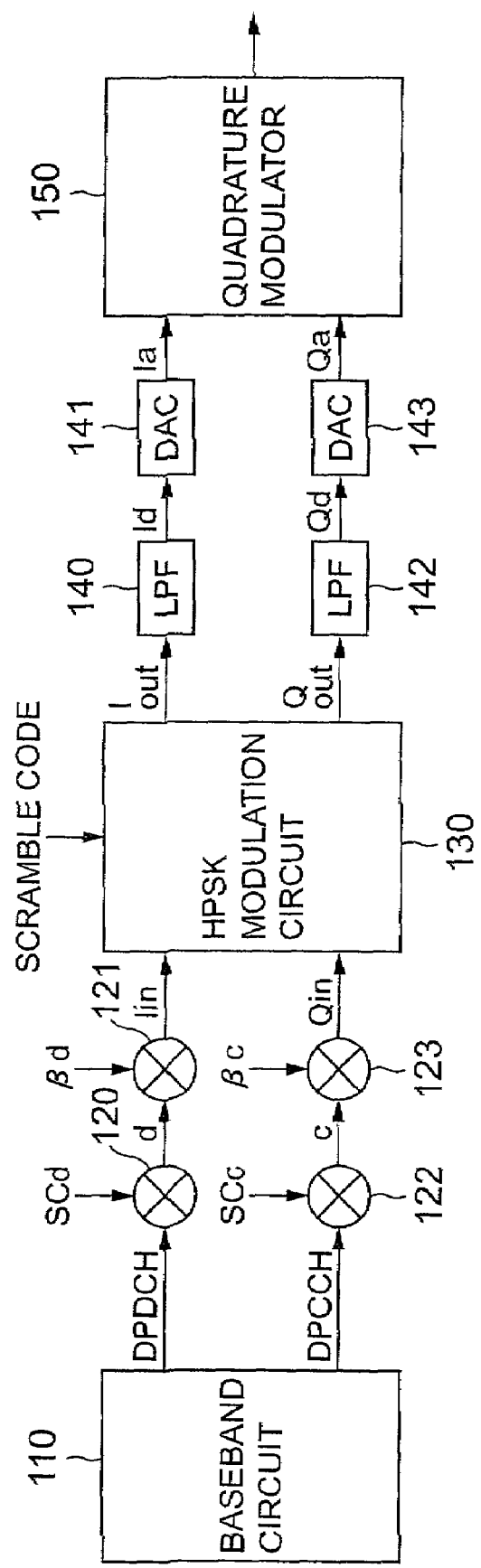
FIG. 1 is a block diagram showing an example of the arrangement of a conventional transmission circuit using the HPSK modulation scheme.

As shown in FIG. 1, the first embodiment is comprised of a baseband circuit 10 for generating and outputting two types of transmission data, namely data channel data DPDCH (Dedicated Physical Data Channel) serving as the first channel data and control channel data DPCCH (Dedicated Physical Control Channel) serving as the second channel data and also outputting gain factors $\beta c$, $\beta d$, $\beta sc$, and $\beta sd$ serving as values for independently weighting I (In-phase) and Q (Quadrature) amplitudes in HPSK modulation and a TPC (Total Power Control) bit for controlling the transmission power of a terminal, a multiplier 20 serving as a spreading means for spreading the data channel data DPDCH output from the baseband circuit 10 by multiplying the data channel data DPDCH by a spreading code SCd, and outputting the resultant data as spread data d, a multiplier 22 serving as a spreading means for spreading the control channel data DPCCH output from the baseband circuit 10 by multiplying the control channel data DPCCH by a spreading code SCc, and outputting the resultant data as spread data c, a multiplier 21 for outputting amplitude data Iin by multiplying the spread data d from the multiplier 20 by the gain factor βsd, a multiplier 23 for outputting amplitude data Qin by multiplying the spread data c from the multiplier 22 by the gain factor βsc, an HPSK modulation circuit 30 serving as a phase modulation means for receiving the amplitude data Iin and Qin respectively output from the multipliers 21 and 23 as I-Q channel data and outputting HPSK-modulated data Iout and Qout by mapping the input amplitude data Iin and Qin on the complex I-Q plane in accordance with a scrambling code which is one of the frequency spreading codes in the CDMA scheme and output from the baseband circuit 10, a digital filter 40 for removing high-frequency components from the HPSK-modulated data Iout output from the HPSK modulation circuit 30 and outputting the resultant data as a digital signal Id, a digital filter 42 for removing high-frequency components from the HPSK-modulated data Qout output from the HPSK modulation circuit 30 and outputting the resultant data as a digital signal Qd, a digital/analog converter 41 for converting the digital signal Id output from the digital filter 40 into an analog signal Ia and outputting it, a digital/analog converter 43 for converting the digital signal Qd output from the digital filter 42 into an analog signal Qa and outputting it, a quadrature modulator 50 for outputting an HPSK signal having a desired frequency by quadrature-modulating the analog signals Ia an Qa respectively output from the digital/analog converters 41 and 43, an AGC amplifier 6 serving as a amplifying means for amplifying the HPSK signal output from the quadrature modulator 50 with a gain based on a control voltage and outputting the amplified signal, an RF circuit 7 which is constituted by a channel filter for removing frequency components other than a desired wave, frequency conversion circuit, interstage filter, driver amplifier, power amplifier, duplexer, and the like, converts the HPSK signal output from the AGC amplifier 6 into a signal having a desired frequency, amplifies the signal with a predetermined gain, and outputs the amplified signal, an antenna 8 for emitting the HPSK signal output from the RF circuit 7 as a radio wave, a CPU 1 for setting a transmission power TXLVL of the control channel data DPCCH at the terminal, a transmission level circuit 2 for determining the transmission power value of the control channel data DPCCH at the terminal on the basis of the TPC bit output from the baseband circuit 10 and the transmission power TXLVL set by the CPU 1, and outputting the determined value, a β offset circuit 3a serving as the first gain offset circuit for determining a first gain correction amount βofst1 corresponding to the transmission power of the data channel data DPDCH on the basis of the combination of the gain factors βc and βd output from the baseband circuit 10, adding the first gain correction amount βofst1 to the transmission power value of the control channel data DPCCH output from the transmission level circuit 2, and outputting the addition result, a β offset circuit 3b serving as the second gain offset circuit for determining a second gain correction amount βofst2 for correcting an output power error in the quadrature modulator 50 by multiplying the spread data d and c by the gain factors β sd and βsc output from the baseband circuit 10 on the basis of the combination of the gain factors βsc and βsd, adding the second gain correction amount βofst2 to the addition result output from the β offset circuit 3a, and outputting the resultant data as an AGC amplifier control code, a voltage generating circuit 4 for generating and outputting a control voltage code for controlling the gain of the AGC amplifier 6 from the AGC amplifier control code output from the β offset circuit 3b, and a digital/analog converter 5 for converting the control voltage code output from the voltage generating circuit 4 into a control voltage and outputting it.

Note that each of the spreading code SCd by which the data channel data DPDCH is multiplied by the multiplier 20 and the spreading code SCc by which the control channel data DPCCH is multiplied by the multiplier 22 is one of the frequency spreading codes in the CDMA scheme and has a rate equal to the chip rate. These codes differ for the respective transmission channels to maintain orthogonality between the channels and are output from the baseband circuit 10.

In the baseband circuit 10, the gain factors βsc and βsd are calculated in advance, whose levels are processed on the basis of logic values βc and βd of gain factors such that the ratio between the logic values βc and βd remains unchanged, and output power from the quadrature modulator 50 remains constant, and the table of the gain factors βc, βd, βsc, and βsd is prepared. Note that the gain factors βc and βsc are set for a control channel, and the gain factors βd and βsd are set for a data channel. Each of the logic values βd and βc of the gain factors takes a value from 0 to 15 in accordance with a transmission data rate. One of the gain factors βd and βc is always "15". In addition, since the control channel data DPCCH is always required, the gain factor βc will never be "0".

The TPC bit output from the baseband circuit 10 is transmitted from a base station (not shown) in a closed loop control period.

The amplitude data Iin and Qin respectively output from the multipliers 21 and 23 are obtained by converting the values of "0"/"1" of the spread data d and c respectively output from the multipliers 20 and 22 into amplitude values with positive and negative signs and expressed by binary codes in two's complement form.

In a closed loop control period, the transmission level circuit 2 adds the TPC bit output from the baseband circuit 10 to the transmission power TXLVL set by the CPU 1 and outputs the transmission power value of the control channel data DPCCH at the antenna 8 end in real time.

Data transmitting operation of the transmission circuit having the above arrangement will be described below.

First of all, the baseband circuit 10 generates and outputs the data channel data DPDCH and control channel data DPCCH. The baseband circuit 10 also outputs the gain factors βc, βd, βsc, and βsd serving as values for independently weighting the I and Q amplitudes in HPSK modulation. In this case, each of the gain factors βc and βd takes a value from 0 to 15 which is determined by a transmission data rate, and are logic values one of which is always "15". The levels of the gain factors βsc and βsd are processed such that the ratio between the logic values βc and βd of the gain factors remains unchanged (βsd:βsc=βd:βc), and the output voltage of the quadrature modulator 50 remains constant. A method of calculating such values will be described below.

Letting βdref and βcref be a reference combination for power among gain factors, the gain factors βsc and βsd can be obtained by using the logic values βc and βd of the gain factors according to equations (1) and (2):

$$\beta sd = \beta d \times \sqrt{[\beta dref^2 + \beta cref^2)/(\beta d^2 + \beta c^2)]} \quad (1)$$

$$\beta sc = \beta c \times \sqrt{[\beta dref^2 + \beta cref^2)/(\beta d^2 + \beta c^2)]} \quad (2)$$

Therefore, $$\beta sd^2 + \beta sc^2 = \beta dref^2 + \beta cref^2 \quad (3)$$

The left-hand side of equation (3) corresponds to the square of the absolute value of the vector of transmission data on the complex I-Q plane in the HPSK modulation circuit 30, i.e., the square of the output power of the quadrature modulator 50, and hence the output power of the quadrature modulator 50 can always be maintained constant regardless of the combination of the gain factors βd and βc.

Figures 3, 4:
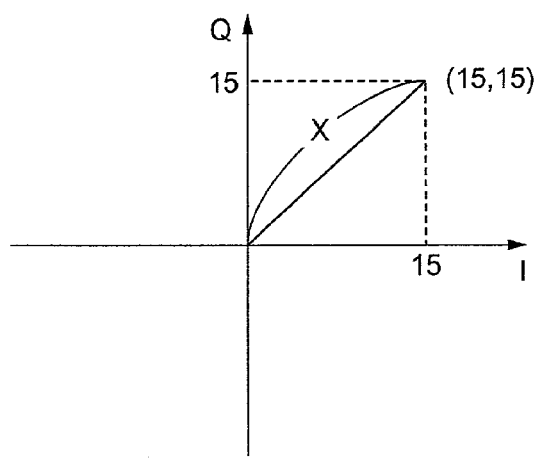
FIG. 3 is a view showing an example of the gain factor table set by the baseband circuit shown in FIG. 2.
FIG. 4 is a coordinate system for explaining how mapping is performed in the HPSK modulation circuit shown in FIG. 2.

FIG. 3 is a view showing an example of the gain factor table set in the baseband circuit 10 in FIG. 2.

As shown in FIG. 3, if, for example, (βdref, βcref)=(15, 15) and the logic values βd and βc of the gain factors are provided, the gain factors βsd and βsc like those shown in FIG. 3 are set in the table in the baseband circuit 10 according to the above equations. The gain factors βsd and βsc are normalized such that the ratio of the logic values βc and βd of the gain factors remains unchanged (βsd:βsc=βd:βc) and βsd²+βsc²=450 holds regardless of the combination of the gain factors βsd and βSc. Note that in this table, the values of βd and βc and the values of βsd and βsc can be interchanged.

The base station sends out a TPC bit for determining the transmission power of the terminal in closed loop control period, and this TPC bit is output from the baseband circuit 10 to the transmission level circuit 2. In general, in the W-CDMA scheme, if reception power from a terminal is larger than a desired power value, the base station sends out, to the terminal, a request to decrease the transmission power at the terminal. If reception power from the terminal is smaller than the desired power value, the base station sends out, to the terminal, a request to increase the transmission power at the terminal.

The control channel data DPCCH output from the baseband circuit 10 is input to the multiplier 20. The multiplier 20 then multiplies the data channel data DPDCH by the spreading code SCd output from the baseband circuit 10 to spread the data channel data DPDCH, and outputs the resultant data as the spread data d.

The control channel data DPCCH output from the baseband circuit 10 is input to the multiplier 22. The multiplier 22 then multiplies the control channel data DPCCH by the spreading code SCc output from the baseband circuit 10 to spread the control channel data DPCCH, and outputs the resultant data as the spread data c.

The spread data d output from the multiplier 20 is input to the multiplier 21. The multiplier 21 then multiplies the spread data d by the gain factor βsd obtained by the above equation, and outputs the resultant data as the amplitude data Iin.

The spread data c output from the multiplier 22 is input to the multiplier 23. The multiplier 23 then multiplies the spread data c by the gain factor βsc obtained by the above equation, and outputs the resultant data as the amplitude data Qin.

The amplitude data Iin and Qin respectively output from the multipliers 21 and 23 are input as I-Q channel data to the HPSK modulation circuit 30. The HPSK modulation circuit 30 then generates and outputs the HPSK-modulated data Iout and Qout by mapping the amplitude data Iin and Qin on the complex I-Q plane in accordance with the scrambling code output from the baseband circuit 10.

FIG. 4 is a graph for explaining how mapping is performed in the HPSK modulation circuit 30 in FIG. 2.

If, for example, (βsc, βsd)=(15, 15) and mapping is performed to set (Iout, Qout)=(Iin, Qin) by using the scrambling code output from the baseband circuit 10, a square $x^2$ of the vector length becomes the output power of the quadrature modulator 50.

The HPSK-modulated data Iout output from the HPSK modulation circuit 30 is input to the digital filter 40. The digital filter 40 then removes high-frequency components from the HPSK-modulated data Iout and outputs the resultant data as the digital signal Id.

The HPSK-modulated data Qout output from the HPSK modulation circuit 30 is input to the digital filter 42. The digital filter 42 then removes high-frequency components from the HPSK-modulated data Iout and outputs the resultant data as the digital signal Qd.

The digital signal Id output from the digital filter 40 is input to the digital/analog converter 41. The digital/analog converter 41 then converts the digital signal Id into the analog signal Ia and outputs it.

The digital signal Qd output from the digital filter 42 is input to the digital/analog converter 43. The digital/analog converter 43 then converts the digital signal Qd into the analog signal Qa and outputs it.

The analog signals Ia and Qa respectively output from the digital/analog converters 41 and 43 are input to the quadrature modulator 50. The quadrature modulator 50 then generates and outputs an HPSK signal having a desired frequency by quadrature-modulating the analog signals Ia and Qa. The power of the HPSK signal output from the quadrature modulator 50 is kept constant according to equation (3) given above regardless of a combination of gain factors.

In an open loop control period, the CPU 1 sets the power of the control channel data DPCCH to be transmitted to the terminal as the initial transmission power TXLVL in the transmission level circuit 2.

When closed loop control starts afterward, the base station sends out a TPC bit for controlling the transmission power of the terminal. This TPC bit is input from the baseband circuit 10 to the transmission level circuit 2.

In the transmission level circuit 2, upon reception of the TPC bit, the value of the TPC bit is added to the transmission power TXLVL, and the resultant data is output as the transmission power value of the control channel data DPCCH.

The transmission power value output from the transmission level circuit 2 is input to the β offset circuit 3a.

The β offset circuit 3a receives the logic values βd and βc of the gain factors output from the baseband circuit 10, and calculates the gain correction amount βofst1 corresponding to the power of the data channel data DPDCH by using the gain factors βd and βc. This gain correction amount βofst1 is obtained by calculating the ratio of total power (βc²+βd²) to power βc² of the control channel data DPCCH and converting it into a dB value, and can be expressed by equation (4) given below. Note that βofst1 corresponding to each gain factor can be provided in the form of a table.

$$\beta ofst1 = 10 \log[(\beta c^2 + \beta d^2)/\beta c^2] \quad (4)$$

The gain correction amount βofst1 calculated by equation (4) given above is added to the transmission power value output from the transmission level circuit 2, and the resultant data is output.

This processing in the β offset circuit 3a is performed to keep the power of the control channel data DPCCH at the antenna 8 end constant.

For example, the ratio of the transmission power of the control channel data DPCCH component to the entire transmission power at the antenna 8 end in the case of (βc, βd)=(15, 15) in FIG. 3 differs from that in the case of (βc, βd) (15, 1). For this reason, if the output power of the quadrature modulator 50 is kept constant as in the above case, the transmission power of the control channel data DPCCH component at the antenna 8 end varies depending on a combination of gain factors. The β offset circuit 3a therefore calculates the power of the data channel data DPDCH component by using the logic values βd and βc of the gain factors, and adds the gain correction amount βofst1 corresponding to the power of the data channel data DPDCH component to the transmission power output from the transmission level circuit 2, thereby keeping the power of the control channel data DPCCH component at the antenna 8 end constant.

Even if the gain factors βsd and βsc by which the spread data d and c are respectively multiplied by the multipliers 21 and 23 take set values like those shown in FIG. 3, the values cannot be accurately expressed unless a sufficient number of bits are assigned to each of the gain factors βsd and βsc.

FIG. 5 is a view for explaining the gain factors used in the transmission circuit shown in FIG. 2.

As shown in FIG. 5, if the gain factors βsd and βsc are expressed in four bits (to be referred to as βsd4 and βsc4), output power $\beta sd4^2+\beta sc4^2$ of the quadrature modulator 50 which is determined by the set values of βsd4 and βsc4 takes different power values depending on a combination of βd and βc.

As indicated by equation (5) given below, the β offset circuit 3b calculates the ratio of the output power of the quadrature modulator 50 which is based on gain factors (βsd4, βsc4) expressed in four bits and the output power of the quadrature modulator 50 which is based on gain factors (βsdref4, βscref4) serving as reference gain factors of the gain factors expressed in four bits, and calculates the gain correction amount βofst2 by converting the ratio into a dB value. This value is then added to the addition result obtained by the β offset circuit 3a, and the resultant data is output as an AGC amplifier control code.

$$\beta ofst2 = -10\log\{(\beta sc4^2+\beta sd4^2)/((\beta scref4^2+\beta sdref4^2)\} \quad (5)$$

The AGC amplifier control code output from the β offset circuit 3b is input to the voltage generating circuit 4. The voltage generating circuit 4 then generates a control voltage code for controlling the gain of the AGC amplifier 6 from the input AGC amplifier control code, and outputs the code.

Figure 6A:
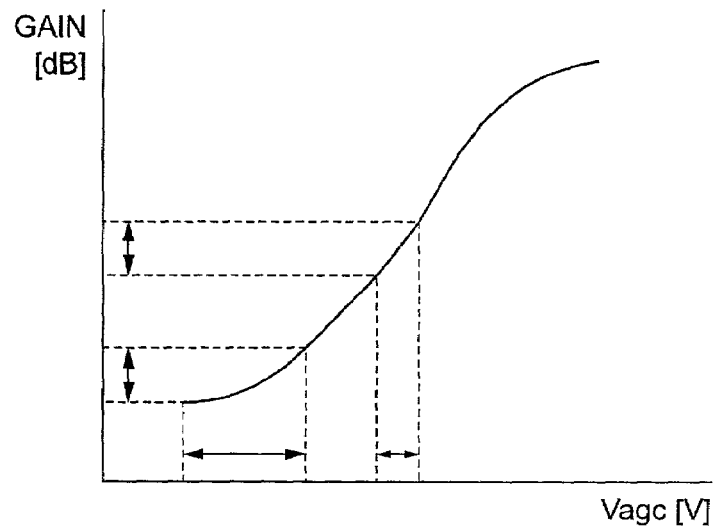
Figure 6B:
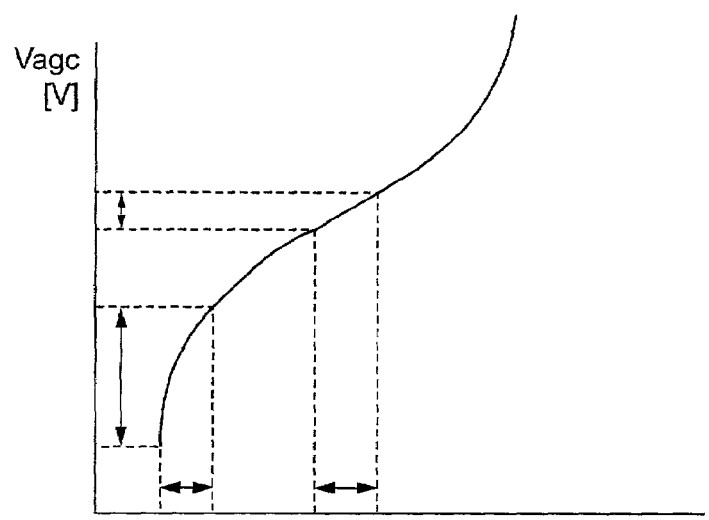

FIGS. 6A and 6B are graphs for explaining the operation of the voltage generating circuit 4 in FIG. 2. FIG. 6A is a graph showing the characteristics of the AGC amplifier 6 in FIG. 2. FIG. 6B is a graph showing the relationship between the input and output of the voltage generating circuit 4.

As shown in FIG. 6A, the AGC amplifier 6 exhibits a nonlinear gain with respect to the input control voltage. For this reason, a change in control voltage which is required to change the gain must be increased at a nonlinear portion as compared with a linear portion.

On the other hand, the AGC amplifier control code output from the β offset circuit 3b and the transmission power value at the antenna 8 end must have a linear relationship.

As shown in FIG. 6B, therefore, the voltage generating circuit 4 generates and outputs a voltage that makes the gain of the AGC amplifier 6 linearly change with respect to the AGC amplifier control code output from the β offset circuit 3b.

The control voltage code output from the voltage generating circuit 4 is input to the digital/analog converter 5, which in turn converts the code into a control voltage and applies it to the AGC amplifier 6.

The AGC amplifier 6 amplifies the HPSK signal output from the quadrature modulator 50 with the gain controlled on the basis of the control voltage applied from the digital/analog converter 5, and outputs the amplified signal.

The HPSK signal amplified by the AGC amplifier 6 is subjected to high-frequency signal processing in the RF circuit 7 and transmitted through the antenna 8.

In this embodiment, the gain factors βc and βd are extracted from the table in the baseband circuit 10 and output to the β offset circuit 3a, and the gain factors βsc and βsd are also extracted from the table and output to the β offset circuit 3b. However, a table like the one shown in FIG. 3 may be set in each of the β offset circuits 3a and 3b.

In the first embodiment, the first channel data is the data channel data of transmission data, and the second channel data is the control channel data of the transmission data. However, the present invention is not limited to this combination.

The first embodiment includes the HPSK modulation circuit 30 for modulating the phases and amplitudes of the first and second channel data. However, the digital modulation scheme to be used is not limited such a modulation scheme.

Figure 7:
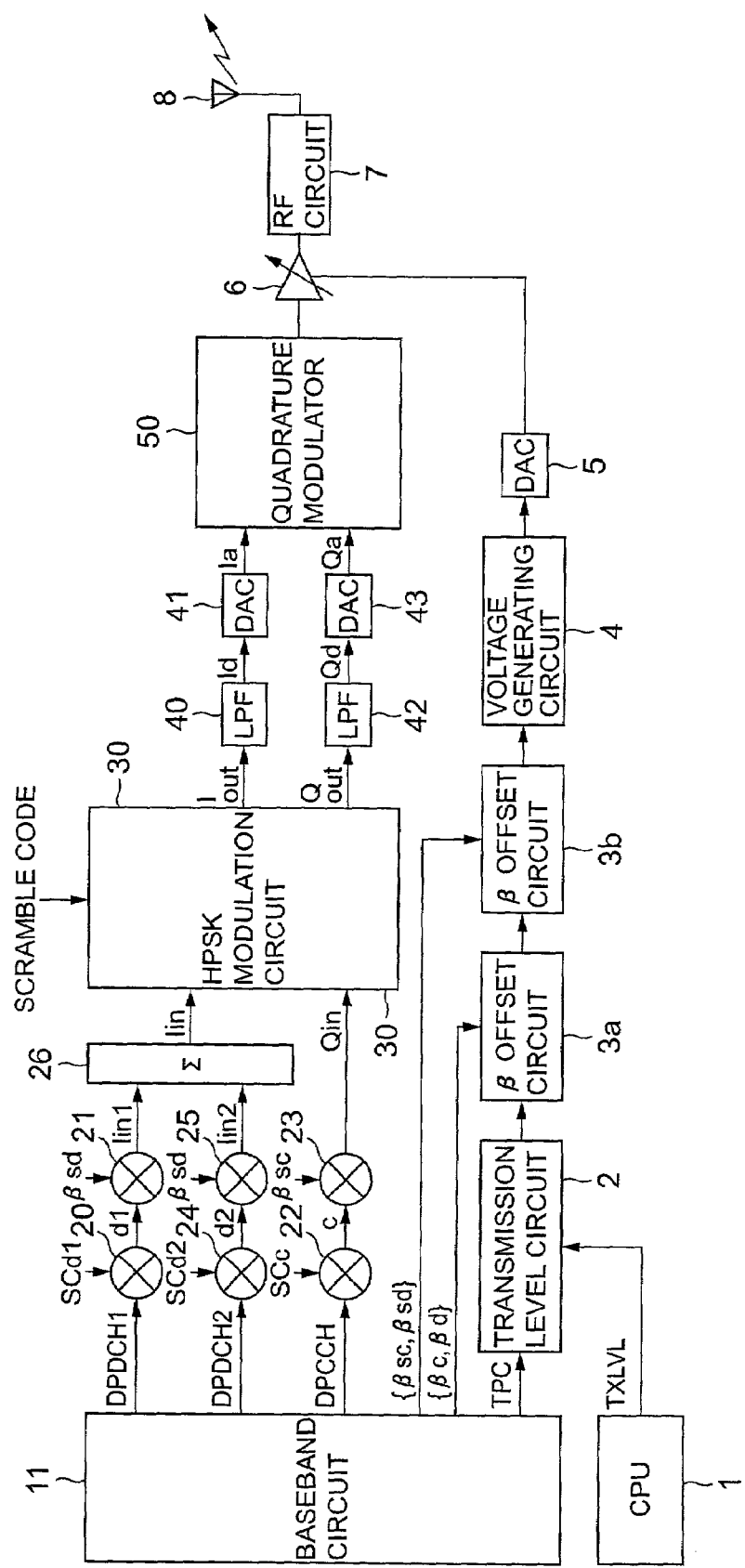
FIG. 7 is a block diagram showing the arrangement of a transmission circuit according to the second embodiment of the present invention.

FIG. 7 is a block diagram showing a transmission circuit according to the second embodiment of the present invention.

As shown in FIG. 7, the second embodiment is configured to input a plurality of data channel data DPDCH1 and DPDCH2 and differs from the embodiment shown in FIG. 1 in that it additionally has a multiplier 24 for spreading the data channel DPDCH2 output from a baseband circuit 11 by multiplying the data channel data DPDCH2 by a spreading code SCd2, and outputting the resultant data as spread data d2, a multiplier 25 for outputting amplitude data Iin2 by multiplying the spread data d2 output from the multiplier 24 by a gain factor βsd, and a synthesizing circuit 26 for synthesizing amplitude data Iin1 and the amplitude data Iin2 respectively output from a multiplier 21 and the multiplier 25 and outputting the resultant data to an HPSK modulation circuit 30.

In the transmission circuit having the above arrangement, the data channel data DPDCH1 and DPDCH2 output from the baseband circuit 11 are respectively spread by a spreading code SCd1 and the spreading code SCd2 by a multiplier 20 and the multiplier 24. The multipliers 21 and 25 respectively multiply the spread data by the gain factor βsd. The synthesizing circuit 26 then synthesizes these two amplitude data and inputs the resultant data to the HPSK modulation circuit 30. Other operations are the same as those shown in FIG. 1.

As described above, even if the circuit is designed to output a plurality of data channel data DPDCH from the baseband circuit 11, the present invention can be applied to the circuit as long as it is configured to spread a plurality of data channel data DPDCH and multiply the data by gain factors.

In this case, a gain correction amount βofst1 in a β offset circuit 3a must be changed in accordance with the number of data channel data DPDCH.

What is claimed is:

1. A transmission circuit, comprising:
    a baseband circuit for generating and outputting transmission data including first and second channel data;
    a spreading unit for spreading the transmission data with a spreading code that differs for each transmission channel;
    a multiplication unit for respectively weighting amplitudes of the first and second channel data by using a combination of two gain factors determined by a transmission data rate;
    a digital modulation unit for digitally modulating the first and second channel data whose amplitudes are weighted by said multiplication unit; and
    a quadrature modulator for quadrature-modulating the first and second channel data digitally modulated by said digital modulation unit and outputting the data as a transmission signal, wherein:
    said multiplication unit weights the amplitudes of the first and second channel data by using gain factors that keep power of the transmission signal output from said quadrature modulator constant regardless of the transmission data rate without changing a ratio of a combination of gain factors determined by the transmission data rate, and
    said multiplication unit weights the amplitudes of the first and second channel data by using gain factors determined on the basis of the power of the transmission signal output from said quadrature modulator without changing the ratio of the combination of gain factors determined by the transmission data rate.

2. A transmission circuit as claimed in claim 1, wherein said multiplication unit weights the amplitudes of the first and second channel data by using gain factors that make a sum of a square of a gain factor for weighting the amplitude of the first channel data and a square of a gain factor for weighting the amplitude of the second channel data constant regardless of the transmission data rate without changing the ratio of the combination of gain factors determined by the transmission data rate.

3. A transmission circuit as claimed in claim 1, wherein said baseband circuit comprises a table storing a gain factor determined by the transmission data rate and a gain factor used by said multiplication unit to weight the transmission data, and outputs a gain factor corresponding to the transmission data rate from said table to said multiplication unit on the basis of the transmission data rate.

4. A transmission circuit as claimed in claim 2, wherein said baseband circuit comprises a table storing a gain factor determined by the transmission data rate and a gain factor used by said multiplication unit to weight the transmission data, and outputs a gain factor corresponding to the transmission data rate from said table to said multiplication unit on the basis of the transmission data rate.

5. A transmission circuit as claimed in claim 1, further comprising an antenna for emitting the transmission signal output from said quadrature modulator as a radio wave.

6. A transmission circuit, comprising:
    a baseband circuit for generating and outputting transmission data including first and second channel data;
    a spreading unit for spreading the transmission data with a spreading code that differs for each transmission channel;
    a multiplication unit for respectively weighting amplitudes of the first and second channel data by using a combination of two gain factors determined by a transmission data rate;
    a digital modulation unit for digitally modulating the first and second channel data whose amplitudes are weighted by said multiplication unit;
    a quadrature modulator for quadrature-modulating the first and second channel data digitally modulated by said digital modulation unit and outputting the data as a transmission signal; and
    an antenna for emitting the transmission signal output from said quadrature modulator as a radio wave,
    wherein said transmission circuit further comprises:
        an amplification unit for amplifying the transmission signal output from said quadrature modulator with a gain based on a control voltage;
        a transmission level circuit for determining a transmission power value of the second channel data component;
        a first gain offset circuit for adding, to a transmission power value determined by said transmission level circuit, a first gain correction amount for controlling a gain of said amplification unit to keep transmission power of the second channel data component at the antenna end constant regardless of the transmission data rate by using a combination of two gain factors determined by the transmission data rate, and outputting the transmission power value; and
        a voltage generating circuit for generating a voltage for controlling the gain of said amplification unit, on the basis of the transmission power value output from said first gain offset circuit, and
    wherein said antenna emits the transmission signal output from said quadrature modulator and amplified by said amplification unit as a transmission signal.

7. A transmission circuit as claimed in claim 5, wherein:
    said baseband circuit comprises a table storing a gain factor determined by the transmission data rate and a gain factor used by said multiplication unit to weight the transmission data, and outputs a gain factor corresponding to the transmission data rate from said table to said multiplication unit on the basis of the transmission data rate, and
    said transmission circuit further comprises:
        an amplification unit for amplifying the transmission signal output from said quadrature modulator with a gain based on a control voltage;
        a transmission level circuit for determining a transmission power value of the second channel data component;
        a first gain offset circuit for adding, to a transmission power value determined by said transmission level circuit, a first gain correction amount for controlling a gain of said amplification unit to keep transmission power of the second channel data component at the antenna end constant regardless of the transmission data rate by using a combination of two gain factors determined by the transmission data rate, and outputting the transmission power value; and
        a voltage generating circuit for generating a voltage for controlling the gain of said amplification unit, on the basis of the transmission power value output from said first gain offset circuit, and
    wherein said antenna emits the transmission signal output from said quadrature modulator and amplified by said amplification unit as a transmission signal.

8. A transmission circuit as claimed in claim 5, wherein:
    said multiplication unit weights the amplitudes of the first and second channel data by using gain factors that make a sum of a square of a gain factor for weighting the amplitude of the first channel data and a square of a gain factor for weighting the amplitude of the second channel data constant regardless of the transmission data rate without changing the ratio of the combination of gain factors determined by the transmission data rate, said baseband circuit comprises a table storing a gain factor determined by the transmission data rate and a gain factor used by said multiplication unit to weight the transmission data, and outputs a gain factor corresponding to the transmission data rate from said table to said multiplication unit on the basis of the transmission data rate, and said transmission circuit further comprises:
- an amplification unit for amplifying the transmission signal output from said quadrature modulator with a gain based on a control voltage;
- a transmission level circuit for determining a transmission power value of the second channel data component;
- a first gain offset circuit for adding, to a transmission power value determined by said transmission level circuit, a first gain correction amount for controlling a gain of said amplification unit to keep transmission power of the second channel data component at the antenna end constant regardless of the transmission data rate by using a combination of two gain factors determined by the transmission data rate, and outputting the transmission power value; and
- a voltage generating circuit for generating a voltage for controlling the gain of said amplification unit on the basis of the transmission power value output from said first gain offset circuit, and wherein said antenna emits the transmission signal output from said quadrature modulator and amplified by said amplification unit as a transmission signal.

9. A transmission circuit as claimed in claim 6, wherein said first gain offset circuit calculates transmission power of the first channel data component by using a combination of two gain factors determined by the transmission data rate, adds the transmission power as the first gain correction amount to the transmission power value determined by said transmission level circuit, and outputs the transmission power value.

10. A transmission circuit as claimed in claim 7, wherein said first gain offset circuit calculates transmission power of the first channel data component by using a combination of two gain factors determined by the transmission data rate, adds the transmission power as the first gain correction amount to the transmission power value determined by said transmission level circuit, and outputs the transmission power value.

11. A transmission circuit as claimed in claim 8, wherein said first gain offset circuit calculates transmission power of the first channel data component by using a combination of two gain factors determined by the transmission data rate, adds the transmission power as the first gain correction amount to the transmission power value determined by said transmission level circuit, and outputs the transmission power value.

12. A transmission circuit as claimed in claim 6, further comprising a second gain offset circuit for adding, to the transmission power value output from said first gain offset circuit, a second gain correction amount which is used to correct an output power error caused in said quadrature modulator when said multiplication unit weights the amplitudes of the first and second channel data by using gain factors for weighting the amplitudes, wherein said voltage generating circuit generates a voltage for controlling the gain of said amplification unit, on the basis of the transmission power value output from said second gain offset circuit.

13. A transmission circuit as claimed in claim 7, further comprising a second gain offset circuit for adding, to the transmission power value output from said first gain offset circuit, a second gain correction amount which is used to correct an output power error caused in said quadrature modulator when said multiplication unit weights the amplitudes of the first and second channel data by using gain factors for weighting the amplitudes, wherein said voltage generating circuit generates a voltage for controlling the gain of said amplification unit, on the basis of the transmission power value output from said second gain offset circuit.

14. A transmission circuit as claimed in claim 8, further comprising a second gain offset circuit for adding, to the transmission power value output from said first gain offset circuit, a second gain correction amount which is used to correct an output power error caused in said quadrature modulator when said multiplication unit weights the amplitudes of the first and second channel data by using gain factors for weighting the amplitudes, wherein said voltage generating circuit generates a voltage for controlling the gain of said amplification unit, on the basis of the transmission power value output from said second gain offset circuit.

15. A transmission circuit as claimed in claim 12, wherein said second gain offset circuit calculates a ratio between output power of said quadrature modulator set when one combination of gain factors of gain factors used to weight the amplitudes of the first and second channel data by said multiplication unit is set as a reference combination, and the reference combination of gain factors are used, and output power of said quadrature modulator set when gain factors used to weight the amplitudes of the first and second channel data by said multiplication unit are used, adds the ratio as the second gain correction amount to the transmission power output from said first gain offset circuit, and outputs the transmission power.

16. A transmission circuit as claimed in claim 13 wherein said second gain offset circuit calculates a ratio between output power of said quadrature modulator set when one combination of gain factors of gain factors used to weight the amplitudes of the first and second channel data by said multiplication unit is set as a reference combination, and the reference combination of gain factors are used, and output power of said quadrature modulator set when gain factors used to weight the amplitudes of the first and second channel data by said multiplication unit are used, adds the ratio as the second gain correction amount to the transmission power output from said first gain offset circuit, and outputs the transmission power.

17. A transmission circuit as claimed in claim 14 wherein said second gain offset circuit calculates a ratio between output power of said quadrature modulator set when one combination of gain factors of gain factors used to weight the amplitudes of the first and second channel data by said multiplication unit is set as a reference combination, and the reference combination of gain factors are used, and output power of said quadrature modulator set when gain factors used to weight the amplitudes of the first and second channel data by said multiplication unit are used, adds the ratio as the second gain correction amount to the transmission power output from said first gain offset circuit, and outputs the transmission power.

18. A transmission circuit as claimed in claim 15, wherein said second gain offset circuit includes a table storing a gain factor determined by the transmission data rate and a gain factor used by said multiplication unit to weight the transmission data.

19. A transmission circuit as claimed in claim 16, wherein said second gain offset circuit includes a table storing a gain factor determined by the transmission data rate and a gain factor used by said multiplication unit to weight the transmission data.

20. A transmission circuit as claimed in claim 17, wherein said second gain offset circuit includes a table storing a gain factor determined by the transmission data rate and a gain factor used by said multiplication unit to weight the transmission data.

21. A transmission circuit as claimed in claim 1, wherein the first channel data is data channel data of the transmission data, and the second channel data is control channel data of the transmission data.

22. A transmission circuit as claimed in claim 6, wherein the first channel data is data channel data of the transmission data, and the second channel data is control channel data of the transmission data.

23. A transmission circuit as claimed in claim 1, wherein said digital modulation unit comprises a phase modulation unit for phase shifting modulating amplitude data of the first and second channel data whose amplitudes are weighted by said multiplication unit.

24. A transmission circuit as claimed in claim 6, wherein said digital modulation unit comprises a phase modulation unit for phase shifting modulating amplitude data of the first and second channel data whose amplitudes are weighted by said multiplication unit.

* * * * *